US012791147B2

(12) United States Patent
Weigand et al.

(10) Patent No.: US 12,791,147 B2
(45) Date of Patent: Nov. 10, 2026

(54) SYSTEM COMPRISING A CARTRIDGE AND AN ACTUATING DEVICE

(71) Applicants: JOST-WERKE DEUTSCHLAND GMBH, Neu-Isenburg (DE); TRIBOSERV GMBH & CO. KG, Geldersheim (DE)

(72) Inventors: Michael Weigand, Geldersheim (DE); Johannes Appelmann, Heusenstamm (DE); Benjamin Kaufhold, Seeburg (DE)

(73) Assignees: Jost-Werke Deutschland GmbH, Neu-Isenburg (DE); TriboServ GmbH & Co. KG, Geldersheim (DE)

( * ) Notice: Subject to any disclaimer, the term of this patent is extended or adjusted under 35 U.S.C. 154(b) by 0 days.

(21) Appl. No.: 19/077,549

(22) Filed: Mar. 12, 2025

(65) Prior Publication Data

US 2025/0290495 A1 Sep. 18, 2025

(30) Foreign Application Priority Data

Mar. 13, 2024 (DE) ......................... 102024107124.9
Jun. 12, 2024 (DE) ......................... 102024116438.7

(51) Int. Cl.
*F16N 7/14* (2006.01)
*B05C 17/01* (2006.01)
*F16N 11/08* (2006.01)

(52) U.S. Cl.
CPC ............ *F16N 7/14* (2013.01); *B05C 17/0103* (2013.01); *F16N 11/08* (2013.01)

(58) Field of Classification Search
CPC ........ F04B 15/02; F04B 9/02; F04B 2205/14; B05C 5/0225; B05C 17/0103; F16N 7/14;
(Continued)

(56) References Cited

U.S. PATENT DOCUMENTS 1,443,101 A * 1/1923 Strauss .................. F16N 13/02
184/7.2
1,905,179 A * 4/1933 Locke ..................... F16N 13/00
184/7.4
(Continued)

FOREIGN PATENT DOCUMENTS

DE 4107479 A1 9/1992
DE 9214096 U1 12/1992
(Continued)

OTHER PUBLICATIONS

European Search Report dated Jul. 17, 2025 for corresponding European Application 25162496.1.

*Primary Examiner* — Mark A Laurenzi
*Assistant Examiner* — Benjamin Doyle
(74) *Attorney, Agent, or Firm* — Hudak, Shunk & Farine Co. LPA

(57) ABSTRACT

A system including a cartridge and an actuating device for actuating the cartridge, wherein the actuating device includes a housing having an interior space in which a linearly acting drive is arranged, the cartridge includes a cylinder space and a displacement element movably arranged in the cylinder space, wherein the displacement element subdivides the cylinder space into a containing space for receiving the viscous medium and an empty space and separates them from each other in a fluid-tight manner, wherein the linearly acting drive can be engaged with the displacement element of the cartridge, wherein the cartridge and the housing each include connecting elements for releasable connection to each other along a joining direction, wherein a seal acting axially with respect to the joining direction is arranged between the housing and the cartridge, and wherein the interior space and empty space are sealed in an airtight manner in the connected state.

18 Claims, 4 Drawing Sheets

(58) Field of Classification Search
CPC .......... F16N 11/08; F16N 25/00; F16N 19/00; F16N 27/00; H02K 7/06
USPC .................................... 184/26, 27.1; 417/510
See application file for complete search history.

(56) References Cited

U.S. PATENT DOCUMENTS

| | | | | |
|---|---|---|---|---|
| 1,917,190 | A * | 7/1933 | Edwards | F16N 13/10 184/27.1 |
| 4,770,613 | A * | 9/1988 | Hoover | F16N 11/04 222/383.2 |
| 5,271,528 | A * | 12/1993 | Chien | F16N 11/08 222/326 |
| 5,732,794 | A * | 3/1998 | Orlitzky | F16N 11/08 222/326 |
| 5,741,275 | A | 4/1998 | Wyssmann | |
| 5,950,764 | A * | 9/1999 | Helbig | F16N 9/02 184/43 |
| 5,971,229 | A * | 10/1999 | May | F16N 11/08 222/327 |
| 8,783,418 | B2 * | 7/2014 | Orlitzky | F16N 13/02 184/37 |
| 11,408,559 | B2 * | 8/2022 | Wawrzola | F16N 11/08 |
| 11,746,656 | B1 | 9/2023 | Fugere | |
| 11,898,698 | B2 * | 2/2024 | Yang | F16N 25/04 |
| 2002/0079336 | A1 * | 6/2002 | Weigand | F16N 11/08 222/389 |
| 2002/0120235 | A1 | 8/2002 | Enggaard | |
| 2004/0155068 | A1 * | 8/2004 | Weigand | F16N 11/08 222/333 |
| 2011/0005866 | A1 * | 1/2011 | Paluncic | F16N 25/00 184/26 |
| 2011/0253481 | A1 * | 10/2011 | Lin | F16N 11/08 184/108 |
| 2012/0132484 | A1 * | 5/2012 | Guillaume | F16N 11/08 184/14 |
| 2013/0168187 | A1 * | 7/2013 | Conley | F16N 7/38 184/6 |
| 2016/0058949 | A1 * | 3/2016 | Bayer | A61M 5/31528 604/207 |
| 2016/0334058 | A1 * | 11/2016 | Yang | F16N 11/08 |
| 2022/0128151 | A1 * | 4/2022 | Tuk | F16J 15/3456 |
| 2023/0026919 | A1 | 1/2023 | Uchino | |
| 2024/0318774 | A1 * | 9/2024 | Yang | F16N 7/14 |

FOREIGN PATENT DOCUMENTS

| | | | |
|---|---|---|---|
| DE | 4321452 | C1 | 1/1995 |
| DE | 4422407 | A1 | 1/1996 |
| DE | 10234881 | A1 | 1/2004 |
| DE | 102005016259 | A1 | 10/2006 |
| DE | 102009027783 | A1 | 1/2011 |
| DE | 202012100014 | U1 | 4/2012 |
| EP | 0598867 | B1 | 3/1997 |
| EP | 1213529 | A1 | 6/2002 |
| EP | 3399214 | A1 | 11/2018 |
| JP | 11-235546 | A | 8/1999 |
| WO | 2022117890 | A1 | 6/2022 |

* cited by examiner

SYSTEM COMPRISING A CARTRIDGE AND AN ACTUATING DEVICE

FIELD OF THE INVENTION

The invention relates to a system with a cartridge and an actuating device for actuating the cartridge for dispensing a viscous medium, in particular for dispensing and/or metering a lubricant to a lubrication point, hereinafter also referred to as a lubricant dispenser.

BACKGROUND OF THE INVENTION

The invention relates, in the narrower sense, to electromechanical lubricators with lubricant cartridges and an electric motor drive for actuating the same. In electromechanical lubricators, a spindle drive is usually used as the transmission element to convert the torque from the drive motor into an axial propulsive movement of a displacement element or piston. The dosing of the lubricant is realized, for example, by a microcontroller-controlled drive depending on the lubricant requirement as well as external influences, such as temperature.

Electronic dosing devices for medical, molecular biological and pharmaceutical applications are known, for example, from document EP 3 399 214 A1. WO 2022/117 890 A1 deals with robot-operated dispensing systems. Other automatic dosing devices for liquid and pasty media in industrial applications are known from documents DE 41 07 479 A1, US 2023/0 026 919 A1 or DE 102 34 881 A1. Document US 2002/0 120 235 A1 discloses a manually operated applicator pen for administering doses of medication. Document DE 10 2009 027 783 A1 discusses a hand-held applicator that can optionally be motor-assisted. The subject of EP 0 598 867 B1 is a gas-pressure-operated device for the targeted delivery of a liquid or viscous medium. JP H11-235 546 A discloses a syringe driven by a stepper motor. Document U.S. Ser. No. 11/746,656 B1 discloses a micro-metering pump for the application of small quantities of liquid materials, in particular for use in the assembly of electronic components.

The invention can be used, for example, in media lubrication, which regularly involves small dosages of lubricant and where automation is therefore helpful. Other applications are in locations that are difficult for people to access or where access is restricted.

Actuating devices and lubricators of this kind are known, for example, from the publications DE 20 2012 100 014 U1, DE 43 21 452 C1, DE 10 2005 016 259 A1, DE 44 22 407 A1 or DE 92 14 096 U1 The known devices uniformly comprise a housing with a linearly acting drive, wherein the drive comprises a drive motor and a transmission and wherein the transmission includes at least one drive spindle. DE 44 22 407 A1 and DE 9 214 096 U1 discuss solutions in which the drive motor acts on the drive spindle via further gear components and sets it in rotation. At the lower end of the housing, there is a cartridge that is either screwed on by means of a thread or connected in one piece to the drive housing. This cartridge has a containing space, a dispensing opening at the lower end and a displacement element or piston for dispensing the viscous medium through a dispensing opening. The piston comprises a threaded element that interacts with the rotatably driven drive spindle of the device in such a way that the piston, which is positioned in the cartridge in a rotationally fixed manner, is moved up or down depending on the direction of rotation when the spindle is turned. Since the piston is connected to the drive spindle by means of the screw thread, either the piston together with the spindle is assigned to the cartridge, as shown in document DE 44 22 407 A1, or both together are assigned to the actuating device, as shown in document DE 9 214 096 U1.

In contrast to this, document DE 10 2005 016 259 A1 shows a solution with a non-exchangeable cartridge that contains a piston without a drive spindle as a structural component. This is made possible by reverse kinematics of the drive. A spindle not shown in the document is moved downwards by a rotatably driven spindle nut. During the downward movement, the spindle presses on the piston mounted in the cartridge, moving it in the direction of the discharge opening to dispense the lubricant. After a lock has been achieved, the cartridge can be easily removed in the axial direction opposite to the operating direction.

In this system, the cartridge and the housing of the actuating device are designed as a single piece and cannot be separated from each other without being destroyed, so that the entire system has to be replaced after the cartridge has been emptied. In contrast, the cartridge and the housing of the Actuating Device according to DE 92 14 096 U1 are connected to each other by means of a screw connection, so that after the lubricant pack in the cartridge housing has been emptied, it can be exchanged for a full one.

While the containing space generally decreases in size when material is dispensed, the volume formed above the displacement element or piston increases. The volume is formed by a part of the cartridge, referred to herein as the empty volume, and the interior space of the housing of the actuating device. If lubricators are used in corrosive environments, for example, it may be necessary for them to be hermetically sealed from the environment to prevent air from entering the interior space of the housing of the actuating device. In such cases, the systems with an integrally connected design are preferred because the increase in volume in connection with the airtight seal causes a vacuum to form in the volume formed above the displacement element.

However, if the cartridge is to be exchangeable and therefore detachably connectable to the housing, a vacuum would impede opening. Therefore, in the case of DE 92 14 096 U1, air exchange between the containing space and the empty space of the cartridge is made possible. This limits the use of the cartridges to those with lubricant packs because the piston does not separate the containing space and the empty space from each other in a fluid-tight manner. Other systems with exchangeable cartridges provide radial ventilation openings for the volume formed above the displacement element. These systems are not very suitable for use in corrosive environments.

SUMMARY OF THE INVENTION

The object of the present invention is therefore to design the system mentioned above in such a way that it is possible to change the cartridge while preventing air from entering the housing during operation.

The object is achieved by a system comprising a cartridge and an actuating device for actuating the cartridge for dispensing a viscous medium, wherein the actuating device comprises a housing having an interior space in which a linearly acting drive is arranged, wherein the cartridge comprises a cylinder-piston assembly having a cylinder space and a displacement element movably arranged in the cylinder space, wherein the displacement element subdivides the cylinder space into a containing space for receiving the viscous medium and an empty space and separates the containing space and the empty space from each other in a fluid-tight manner, wherein the linearly acting drive can be brought into engagement with the displacement element of the cartridge, wherein the cartridge and the housing each comprise connecting elements for releasable connection to each other along a joining direction, wherein a seal acting axially with respect to the joining direction is arranged between the housing and the cartridge and wherein the interior space and the empty space are sealed in an airtight manner in the connected state.

The invention thus combines the advantages of a replaceable cartridge with a displacement element, which, as part of the cartridge, delimits the containing space in a fluid-tight manner so that the lubricant is received therein without additional packaging. In addition, the axially acting seal between the housing and the cartridge in the connected state effects the airtight sealing of the interior space and the empty space and no ambient air is able to enter. At the same time, the connection between the cartridge and the housing of the actuating device can be easily disengaged, because even a short axial movement creates a sufficient opening gap through which the interior space and the empty space are ventilated.

Preferably, the drive comprises a drive motor and a transmission, wherein the transmission comprises a drive spindle and a spindle nut, wherein the drive motor is directly or indirectly engaged with the spindle nut for transmitting a rotary motion, wherein the drive spindle defines a drive axis, about which the spindle nut is rotatably arranged and along which the drive spindle is arranged to be reciprocable over a stroke upon rotation of the spindle nut relative to the housing.

This drive ensures that the drive spindle, as a transmission element, does not rotate by itself and therefore no threaded connection to the displacement element (piston) is necessary. The piston, as a component of the cartridge, can therefore always be easily disconnected from the drive, i.e. without a screwing movement.

The housing preferably comprises a wall through which the drive spindle can be passed with a first axial end, wherein the drive spindle can be engaged at the first axial end with the displacement element of the cartridge.

Furthermore, the drive spindle preferably comprises a first rotation-preventing element along a section in the housing, wherein a second rotation-preventing element associated with the housing is provided, and wherein the first rotation-preventing element and the second rotation-preventing element interact in such a way that the spindle is supported in a non-rotatable manner against the housing over at least part of the stroke.

Under load, the axial pressure on the drive spindle increases. This initially prevents the drive spindle from turning with the spindle nut. However, if the torque transmitted by the spindle nut to the drive spindle during rotation exceeds a certain value, the drive spindle tends to rotate with the spindle nut, which means that when the drive is actuated, the axial forward movement of the drive spindle and the lubricant discharge are no longer guaranteed. Conversely, the drive spindle may also tend to turn if the friction locking of the drive spindle without load is too low. This may be the case, for example, if the drive spindle has been completely unscrewed out of the housing after the cartridge has been emptied and now has to be turned back. The rotation-preventing element helps to prevent this.

On the other hand, it is very helpful for the drive spindle to be able to turn freely, especially in the case of lubricators with replaceable cartridges, where the cartridge is generally fixed to the housing of the actuating device with a screw connection. When screwing the cartridge onto the housing of the device, contact between the drive spindle and the displacement element occurs at some point, which may make it necessary to rotate the drive spindle in order to avoid damage to the cartridge or the actuating device.

The housing, hereinafter also referred to as the drive housing, typically encloses a space in which both the drive motor and the transmission and, if present, an electronic control system for the drive motor can be accommodated. The drive spindle is optionally guided out of the housing at its first axial end in the retracted state and in any case in the extended state, i.e. a section of the drive spindle protrudes out of the housing through the wall. The remaining section of the drive spindle always remains within the housing.

The first rotation-preventing element is located at least along the portion of the drive spindle that always remains in the housing. The second rotation-preventing element associated with the housing engages the first rotation-preventing element at least over part of the stroke and preferably over the entire stroke, whereby the drive spindle is supported in a non-rotatable manner.

When the drive spindle is engaged at its first axial end with the cartridge's displacement element and is pressed against it in order to drive the displacement element into the cartridge, it is supported in the axial direction against the spindle nut. The spindle nut is supported for this purpose against a structural component, for example a carrier plate, in the housing. In order to enable low-wear rotation of the spindle nut even under load, a sliding element is preferably located between the spindle nut and the structural component, which can be loosely inserted there or attached to the spindle nut or to the structural component.

Preferably, the first rotation-preventing element and the second rotation-preventing element form a form fit or a force fit.

Analogous to a clutch, the first and second rotation-preventing elements, which interact in the housing, connect the drive spindle and the housing either rigidly or, preferably, with limited torque transmission, analogous to a slip clutch. The term “anti-rotation device” as used in this document is therefore not limited to a rigid connection, but also includes connections that allow the drive spindle to rotate relative to the housing when a certain torque occurs or is exceeded. A torque limiter with limited torque transmission is therefore preferred over a rigid anti-rotation device in cases where it is necessary to ensure that the transmission and/or the drive motor are protected from damage when high torques occur. This may be necessary, for example, when unscrewing a detachably connected cartridge, as described above.

A force-locking rotation lock—analogous to a friction clutch—can be realized, for example, by pressing a friction element onto the outer circumference of the drive spindle as a second rotation-preventing element, in addition to the first rotation-preventing element. Depending on the contact pressure, size of the friction surface and material pairing, the spindle can be held in this way up to a certain torque. According to an alternative solution, the friction element can also be configured similarly to a self-locking nut so that it interacts with parts of the thread flanks or with the complete thread profile in a frictional or force-locking manner on an axial section of the threaded spindle.

An anti-rotation device with limited torque transmission can be achieved not only by means of a force-locking connection, but also by means of a form-fit. In such cases, the first rotation-preventing element and the second rotation-preventing element preferably form a form fit, wherein the second rotation-preventing element is elastically deformable against a restoring force or can be moved away from the first rotation-preventing element, thereby releasing the form fit.

A form fit can preferably be achieved by configuring the first rotation-preventing element in the form of one or more flat portions along the section on the drive spindle and by the second rotation-preventing element comprising one or more guide elements that directly or indirectly abut the flat portion or flat portions and are connected to the housing.

Alternatively or additionally, the first rotation-preventing element can be configured in the form of one or more recesses along the section in the drive spindle and the second rotation-preventing element comprises one or more projections that engage in the recess or recesses and are indirectly or directly connected to the housing.

The flat or flats along the section of the drive spindle are also referred to hereinbelow as the spanner flat or flats. Two guide elements of the second rotation-preventing element form a matching spanner mouth which engages around the spanner flats of the drive spindle. The recess or recesses can be realized in the form of notches or grooves or openings. The projection or projections of the second rotation-preventing element can be formed by pins engaging in the recesses.

The guide element connected to the housing is preferably configured such that it can be moved away from the first rotation-preventing element in an elastic manner against a restoring force.

In a system according to the invention (lubricant dispenser), the cartridge comprises a containing space for receiving the viscous medium and an outlet opening for the viscous medium.

The cartridge is preferably connectable to the housing by means of a screw connection or a bayonet connection. Accordingly, the connecting elements of the cartridge and the housing are preferably in the form of threads or elements of a bayonet lock.

A screw connection or a bayonet connection allows for easier opening even when there is a vacuum in the housing.

According to a preferred embodiment of the device, the drive spindle comprises a coupling element at its first axial end for connection to the displacement element or piston of the cartridge.

The coupling element is further preferably connected to the drive spindle in a rotationally fixed manner and comprises a first stop element, radially spaced from the drive axis, for engagement with the displacement element or piston.

The displacement element preferably also comprises a second stop element that is radially spaced from the drive axis, wherein the first stop element and the second stop element interact in such a way that the coupling element can be supported against the displacement element in a non-rotatable manner.

In this embodiment, the lubricant dispenser provides a dual rotation lock that works as follows: In the case of lower torques, for example when the coupling element has no or only light contact with the displacement element, the drive spindle is held by means of the first rotation-preventing element and the second rotation-preventing element and is moved as a result of the rotation of the spindle nut. As soon as the coupling element exerts axial pressure on the displacement element, the torque transmitted from the spindle nut to the drive spindle increases until the above-described anti-rotation device with limited torque transmission clears the drive spindle, allowing it to rotate with the spindle nut. This initially prevents further axial extension of the drive spindle. However, the drive spindle only turns until the first stop element of the coupling element and the second stop element of the displacement element engage. From this moment on, the coupling element abuts against the displacement element via the first stop element and the second stop element. The displacement element, in turn, is supported against the cartridge wall, for example, by frictional contact or by form fit, so that further rotation of the drive spindle is effectively prevented. The drive spindle is then further extended in the axial direction with the coupling element, and the displacement element is thus pushed forward into the containing space of the cartridge, whereby the viscous medium is pressed out of the containing space through the dispensing opening.

In an advantageous further development of the invention, the device comprises a motor control connected to the drive motor, which includes a sensor system for determining an upper and/or a lower end position of the drive spindle.

The sensor system can, for example, be configured by means of electronic measuring equipment for determining the current or power consumption of the drive motor and thus for indirectly determining the required torque. Alternatively or additionally, the sensor system can comprise one or more non-contact or mechanical position switches.

Furthermore, the motor control is arranged to switch off the drive motor when the upper or lower end position is determined or to reverse the direction of rotation of the drive motor.

This ensures that the drive motor can always move the drive spindle out of the respective end position.

The device also preferably comprises an elastic element that is arranged in such a way that it is indirectly or directly biased between the drive spindle and the housing in an upper end position of the drive spindle that is retracted into the housing with respect to the axial direction.

The elastic element ensures that the torque required to drive the drive spindle when the end position is reached increases slowly or in a defined manner, so that the end position can be reliably determined by determining the current or power consumption and the drive spindle is prevented from getting stuck in the end position so that the torque of the motor is no longer sufficient to move it out of this position.

For this purpose, the elastic element can preferably be arranged between the coupling element and a first wall section of the housing. Alternatively or additionally, the elastic element can be located between a second axial end of the drive spindle and a second wall section of the housing.

The seal is preferably an annular, elastic seal with a U-shaped profile.

Furthermore, the actuating device comprises a carrier plate which, in the connected state, is gripped axially between a portion of the housing and a portion of the cartridge.

This is preferably the carrier plate against which the spindle nut abuts under load when the drive spindle presses with its first axial end against the cartridge's displacement element.

The U-shaped profile of the seal advantageously engages the carrier plate at the edge. Due to the elasticity of the seal, the carrier plate can be fixed in a receiving means of the housing, which is shaped to match the contour of the carrier plate, without any further fastening means. The seal thus also serves as an assembly aid and allows easy, tool-free removal of the carrier plate to provide access to the inside of the housing.

Furthermore, the seal, preferably together with the carrier plate in the connected state, is axially gripped between the section of the housing and the section of the cartridge.

The drive axis and the joining direction preferably coincide. This simplifies the assembly of the system, because, in particular in the case of a screw connection or a bayonet connection, the cartridge can be screwed to the housing in a rotating manner about the drive axis, and a rotational symmetry of the system that is present in parts and the free running of the drive spindle can be utilized as described above.

The Actuating Device comprises a switch for the drive motor that operates in a contactless manner through a closed section of a wall of the housing.

This measure avoids further opening of the housing wall, which contributes to the effective sealing of the system. An actuating element of the switch can be attached to the outside of the housing so that it can be easily operated manually and communicates without contact with a sensor element attached to the inside of the housing wall, i.e. in the airtight interior space of the housing, which is connected to the motor control, for example. Communication can be based, for example, on magnetic or capacitive coupling.

The cartridge comprises a dispensing opening through which the viscous medium can be dispensed from the containing space of the cartridge. The dispensing opening is preferably secured by means of a non-return valve against backflow of the dispensed medium.

This prevents any medium that has already been dispensed from being unintentionally sucked back into the cartridge in the event of a possible thermal volume reduction of the medium in the containing space or, for example, a retraction of the displacement element caused by a possible vacuum in the interior.

BRIEF DESCRIPTION OF THE DRAWINGS

The invention will be further explained below with reference to the drawings. It is shown in FIG. 1: a cross-sectional view of the system according to the invention in a first cross-sectional plane.

DETAILED DESCRIPTION OF THE INVENTION

Figure 1:
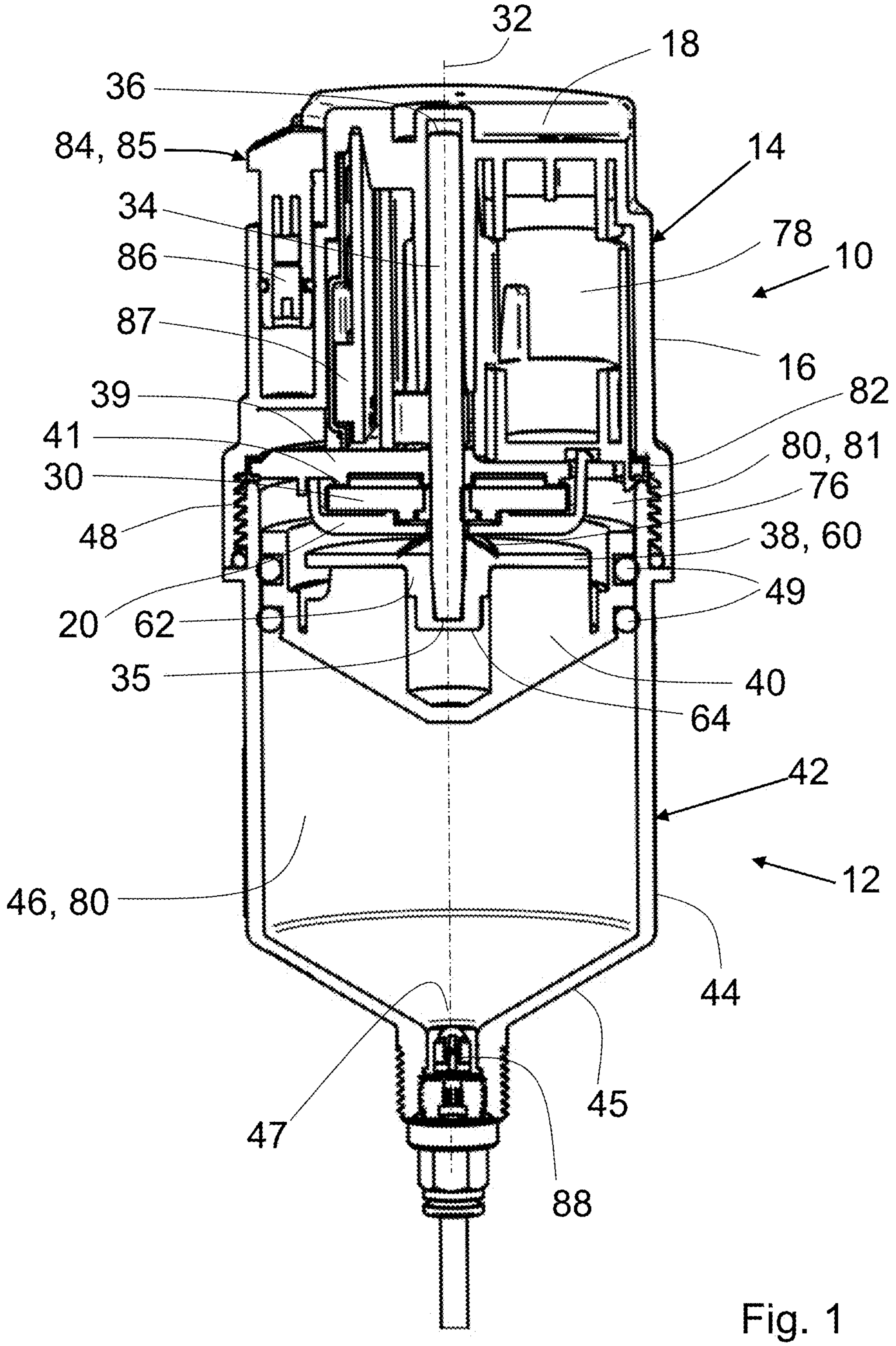
Figure 2:
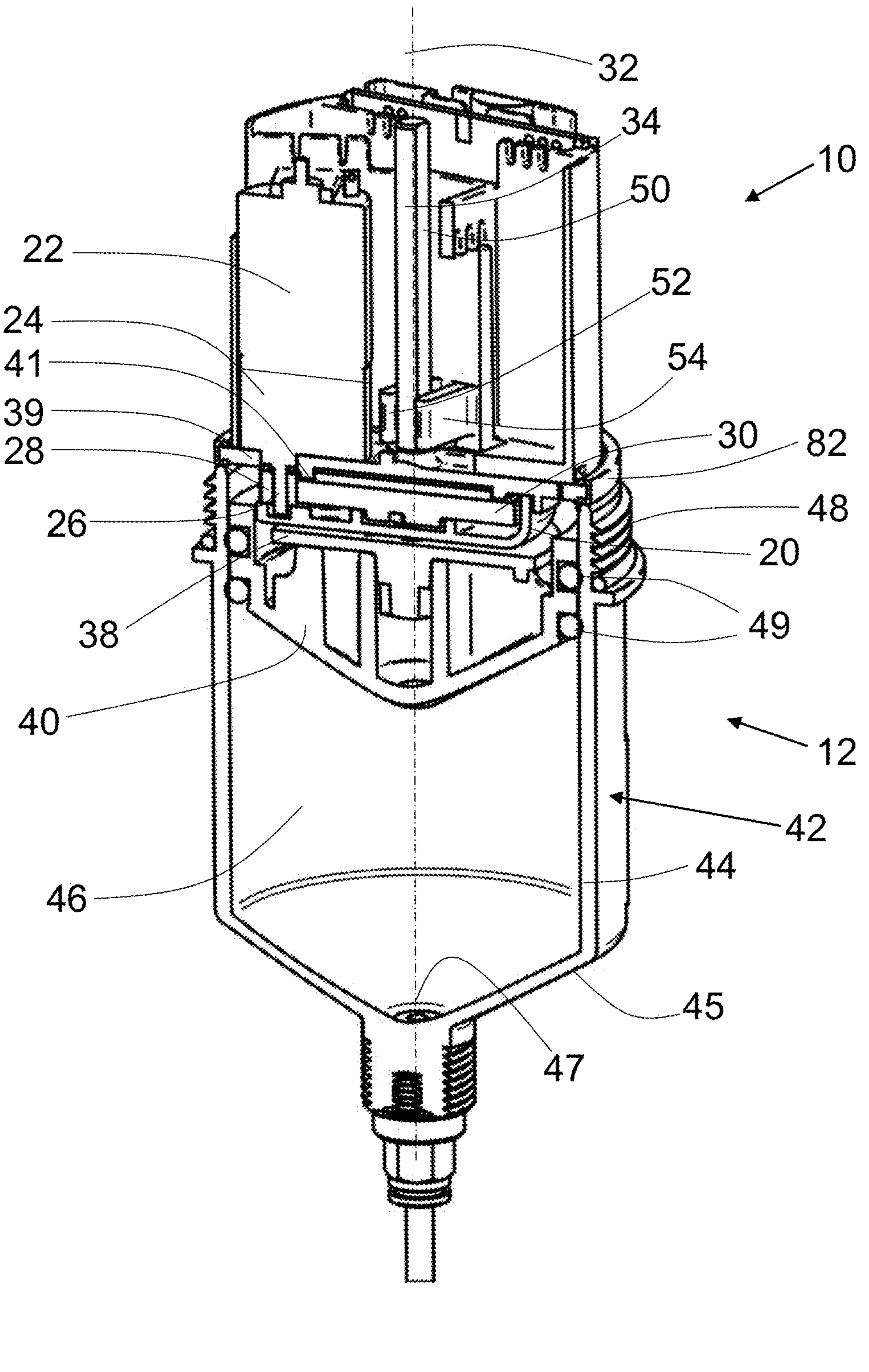
FIG. 2: the system according to the invention in FIG. 1 in perspective cross-sectional views in a second plane.
Figure 3:
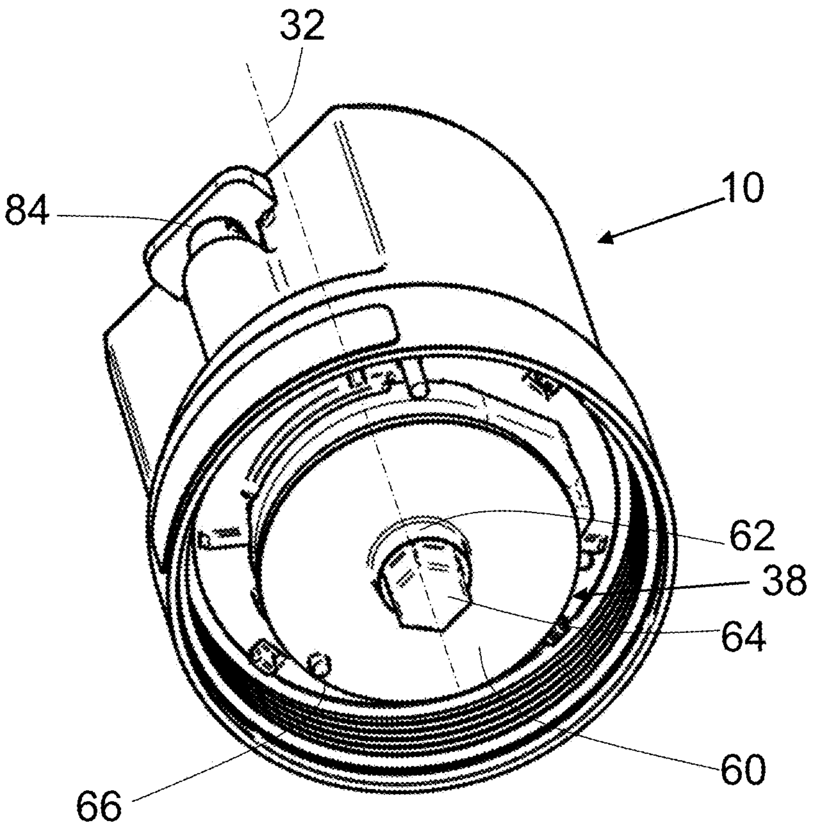
FIG. 3 a perspective view of the actuating device according to the invention, looking at the connection side to the cartridge.
Figure 4:
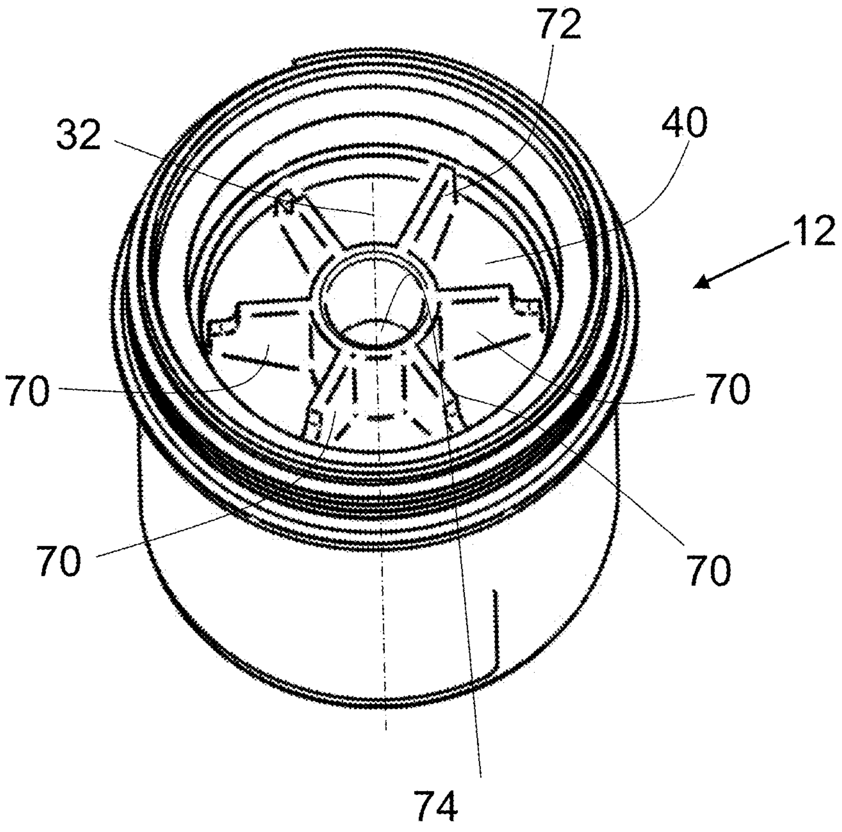
FIG. 4 a perspective view of the cartridge, looking at the connection side to the actuating device according to the invention.

The same composite system, consisting of an actuating device 10 and a cartridge 12 connected to it, is shown in FIGS. 1 and 2. The actuating device 10 has a housing 14 with a peripheral housing wall 16, a housing cover 18, also referred to as a second wall section of the housing, and a housing base 20, also referred to as the first wall section of the housing, wherein in the illustration of FIG. 2, the housing 14 of the actuating device 10, with the exception of the housing base 20, has been left out to make the internal elements more visible. FIG. 3 shows the Actuating Device according to the invention separately. FIG. 4 shows the cartridge from FIGS. 1 and 2 separately.

A linearly acting drive, consisting of a drive motor 22 and a transmission, is arranged in the housing 14. The transmission includes a motor transmission 24 that is directly connected to the drive motor. An output shaft 26 extends out of the common housing. A spur gear 28 is mounted on the output shaft 26, which transmits the rotation of the output shaft 26 to a spindle nut 30 with a peripheral gear rim. Along a drive axis 32, a drive spindle 34 extends as a further part of the transmission, interacting with the spindle nut. The spindle nut 30 thus turns around this drive axis 32.

The drive spindle 34 is guided out of the housing 14 of the actuating device 10 with its first axial end 35 through the housing base 20. A coupling element 38 is arranged on the first axial end 35 of the drive spindle 34 and is connected to the drive spindle 34 in a rotationally fixed manner. In the assembled state as shown in FIGS. 1 and 2, the drive spindle 34 is indirectly engaged with a displacement element or piston 40 of the cartridge 12 via the coupling element 38.

A carrier plate 39 is located in the housing 14, against which the spindle nut 30 abuts under load. The housing base 20 is suspended in the carrier plate 39 from below. Its object is to protect the spindle nut 30 from below and to hold it in position. The object of the housing base 20 is not to divert the axial force acting on the spindle nut under load into the structure of the housing. Between the spindle nut 30 and the carrier plate 39 is a sliding element 41 for low-wear rotation of the spindle nut even under load.

The cartridge 12 further comprises a cartridge wall 42 having a peripheral wall 44 and a bottom wall 45 opposite the displacement element or piston 40. The cartridge wall 42 together with the piston 40 encloses a containing space 46 for receiving the viscous medium not shown. A dispensing opening 47 is located in the bottom wall 45. When the piston 40 is moved by means of the drive from the position shown in FIGS. 1 and 2 towards the bottom wall 45, the viscous medium is conveyed out of the cartridge 12 through the dispensing opening 47. In order to prevent medium that has already been dispensed from being unintentionally sucked back into the cartridge, for example when the piston 40 moves upwards again, whether intentionally or not, or when the volume of the medium in the containing space is reduced by cooling, the cartridge 12 has a non-return valve 88 inside, in front of or behind the dispensing opening 47.

The housing 14 of the actuating device 10 and the wall 42 of the cartridge 12 are designed in two parts and each comprise connecting elements for releasable connection to one another along a joining direction. In the embodiment, this is a screw connection 48. The screw connection 48 is only one possible embodiment of a releasable connection between the actuating device 10 and the cartridge 12. In its place, for example, a bayonet connection, a latching connection or another self-locking plug connection can be provided. The joining direction coincides with the drive axis 32, so that the cartridge 12 can be screwed onto the housing 14 while rotating about the drive axis 32.

The piston 40 is sealed with respect to the cylindrical inner surface of the peripheral wall 44 of the cartridge 12 by means of a double O-ring seal 49. The piston 40 thus subdivides a cylinder space 80 into the containing space 46 and an empty space 81 and separates these partial spaces from each other in a fluid-tight manner so that the viscous medium cannot escape upwards in the direction of the actuating device 10 when pressure is applied. Furthermore, the double O-ring seal 49 effects a rotational lock of the piston 40 with respect to the cartridge wall 42 and the housing 14 of the actuating device 10 connected thereto.

With regard to the joining direction, an axially acting seal 82 is arranged between the housing 14 and the cartridge 12, with which the interior space 78 and the empty space 81 are sealed airtight in the connected state. The screw connection 48 between the cartridge 12 and the housing 14 of the actuating device is preferred to alternative connections because even a short turn creates a sufficient opening gap through which the interior space 78 and the empty space 81 are vented. With a low thread pitch of the screw connection 48, the force required to overcome any vacuum is only low. Therefore, a thread pitch of the screw connection of at least 0.25 mm and particularly preferably of at least 0.5 mm as well as at most 2 mm and particularly preferably at most 1 mm is preferred.

The seal is an annular, elastic seal with a U-shaped profile that encloses the carrier plate 39 at the edges. Due to the elasticity of the seal 82, the carrier plate 39 can be fixed in a force-locked manner without further fastening means in a receiving means, which is formed in the circumferential housing wall 16 and corresponds to the contour of the carrier plate 39. The seal 82 thus also serves as an assembly aid and allows for easy, tool-free removal of the carrier plate 39 to provide access to the drive components located inside the housing.

In the connected state shown, the carrier plate 39 together with the seal 82 is axially gripped between the receiving means in the peripheral housing wall 16 and an end section of the peripheral wall 44 of the cartridge 12.

In order to prevent the drive spindle 34 from turning with the rotating spindle nut 30 when there is no load or only a low load, the spindle nut comprises a first rotation-preventing element in the form of two opposing flattening or spanner flats 50 along a section in the housing 14. Two guide elements 52, 54, which are connected to the housing 14 and abut opposite one another on both sides of the drive spindle 34, abut against the spanner flats 50, forming the second rotation-preventing element. The two guide elements 52, 54 form a fork-shaped arrangement with a kind of key mouth in their space, which engages around the spanner flats 50 of the drive spindle 34 in a form-fitting manner. The guide elements 52 and 54 are designed so that, with respect to the drive axis 32, they can deflect elastically radially outwards if the torque exerted by the drive spindle 34 via the spanner flats 50 exceeds a certain value. Elastic deflection means that the guide elements 52 and 54 of the radially outwardly oriented movement oppose a restoring force which moves them back to the initial state after the cause of the movement has ceased to exist. This ensures that the drive spindle 34 can rotate with the spindle nut 30, for example, when the cartridge 12 is screwed to the housing 14 of the actuating device and a correspondingly high torque is transmitted to the drive spindle. The first rotation-preventing element and the second rotation-preventing element thus form a rotation-preventing device with limited torque transmission.

The coupling element 38 is a predominantly cylindrically symmetrical element with a disk 60, in axial continuation of a cylindrical extension 62 and in turn in axial continuation of a hexagonal element 64, which can be actuated with a standard key, for example, to manually move the drive spindle up or down. In the cylindrical extension 62 and the hexagonal element 64, there is a bore from the side of the coupling element 38 facing the housing 14, into which the drive spindle 34 is pressed for the purpose of force closure, thus creating a rotationally fixed connection between the drive spindle 34 and the coupling element 38. In order to ensure linear drive of the piston 40 at high loads despite the anti-rotation device with limited torque transmission, the drive spindle 34 must be prevented from turning further during operation. For this purpose, the coupling element 38 comprises a first stop element 66 on its underside facing the cartridge, radially spaced from the drive axis 32.

The displacement element 40 comprises on its upper side facing the actuating device 10 a plurality of radially arranged stiffening ribs 70, of which a stiffening rib 72 forms a second stop element of the piston 40. On their upper side facing the Actuating Device 10, the stiffening ribs 70, 72 define a flat bearing surface perpendicular to the drive axis 32, on which the disc 60 of the coupling element 38 rests. The cylindrical extension 62 is then centered in a center bore 74 in the piston 40.

The second stop element 72 differs from the remaining stiffening rib 70 in that the latter comprises clearances in each of the radially outer areas, which allow the first stop element 66 to pass during a relative rotation of the coupling element 38 to the piston 40. Depending on the direction of rotation of the drive spindle 34, the first stop element 66 strikes either on the left or on the right against the continuous stiffening rib 72 after a maximum of approximately one complete revolution. The first stop element 66 and the second stop element 72 then interact in such a way that the coupling element 38 is non-rotatably abutted against the displacement element 40.

Both the housing 14 of the actuating device 10 and the wall 42 of the cartridge 12 comprise a substantially circular cylindrical basic shape, the longitudinal axis of which coincides with the drive axis 32 of the drive spindle 34. This ensures that when the cartridge 12 is screwed into the housing 14 of the actuating device 10, the piston 40 rotates around the drive axis 32 and thus transmits a torque around this axis via the coupling element 38 to the drive spindle 34 as soon as the disc 60 rests on the flat bearing surface. The rotation lock with limited torque transmission releases the drive spindle for rotation when the preset limit torque is exceeded, so that the cartridge and the actuating device are not damaged when screwed together.

In addition to the drive motor and the transmission, the housing 14 of the actuating device 10 contains a not shown motor control connected to the drive motor, the motor control including an electronic sensor system for determining the upper and lower end positions of the drive spindle 34. The upper end position is defined by an elastic element in the form of a spring washer 76 between the coupling element 38 and the housing base 20. The spring washer 76 is biased between the coupling element 38 and the housing 14 and thus indirectly between the drive spindle 34 and the housing 14 as the drive spindle 34 approaches its upper end position with respect to the axial direction. As a result, the torque required for the drive initially increases linearly, causing the sensor system of the motor control to register an increased power consumption of the drive motor 22 and to switch it off when a pre-set limit value is reached.

Instead of arranging an elastic element between the coupling element 38 and the second wall section 18 of the housing 14, an elastic element can alternatively or additionally be provided between a second axial end 36 of the drive spindle 34 and the second wall section of the housing 14, that is to say the housing cover 18.

The actuating device 10 comprises a switch 84 for the drive motor 22, which switch acts in a contactless manner through a closed section of the peripheral housing wall 16. This prevents a further opening of the housing wall, which contributes to the effective sealing of the system. A mechanical actuating element 85 of the switch 84 is provided on the outside of the housing 14 for manual actuation by pressure from above, wherein it can be moved downwards relative to the housing 14, preferably against a spring tension. In a lower area of the actuating element 85 there is a transmitter 86, for example in the form of a permanent magnet, which also moves downwards relative to the housing 14 when actuated. A sensor element 87, for example in the form of a magnetic sensor, is mounted on the inside of the housing wall 16, i.e. in the hermetically sealed interior space 78. The sensor element 87 is connected to the drive motor 22, for example via the motor control, in order to manually activate or deactivate the actuating device 10 by means of a switching pulse.

LIST OF REFERENCE SIGNS

10 Actuating device
12 Cartridge
14 Housing of the actuating device
16 Peripheral housing wall
18 Housing cover, second wall section of the housing
20 Housing base, first wall section of the housing
22 Drive motor
24 Motor transmission
26 Output shaft of the motor transmission
28 Spur gear
30 Spindle nut
32 Drive axis
34 Drive spindle
35 First axial end of the drive spindle
36 Second axial end of the drive spindle
38 Coupling element
39 Carrier plate
40 Displacement element, piston
41 Sliding element
42 Cartridge wall
44 Peripheral wall
45 Bottom wall
46 Containing space
47 Dispensing opening
48 Screw connection
49 O-ring seal
50 Flattening, spanner flat
52 Guide element
54 Guide element
60 Disk of the coupling element
62 Cylindrical extension
64 Hexagonal element
66 First stop element
70 Stiffening rib
72 Second stop element, stiffening rib
74 Center bore
76 Elastic element, spring washer
78 Interior space of the housing
80 Cylinder space of the cartridge
81 Empty space of the cartridge
82 Seal
84 Switch
86 Transmitter
87 Sensor element
88 Non-return valve

What is claimed is:

1. A system, comprising:

a cartridge and an actuating device for actuating the cartridge to dispense a viscous medium, wherein the actuating device comprises a housing having an interior space in which a linearly acting drive is arranged, wherein the cartridge comprises a cylinder-piston arrangement having a cylinder space and a displacement element movably arranged in the cylinder space, wherein the displacement element subdivides the cylinder space into a containing space for receiving the viscous medium and an empty space and separates the containing space and the empty space from each other in a fluid-tight manner, wherein the linearly acting drive can be engaged with the displacement element of the cartridge, wherein the cartridge and the housing each comprise connecting elements for releasable connection to each other along a joining direction, wherein a seal acting axially with respect to the joining direction is arranged between the housing and the cartridge, wherein the interior space and the empty space are sealed in an airtight manner in the connected state, wherein the drive comprises a drive motor and a transmission, the transmission comprising a drive spindle and a spindle nut, the drive motor being in direct or indirect engagement with the spindle nut for transmitting a rotational movement, wherein the drive spindle defines a drive axis about which the spindle nut is rotatably arranged and along which the drive spindle is arranged to reciprocate over a stroke upon rotation of the spindle nut relative to the housing, wherein the drive spindle comprises at the first axial end a coupling element for connection to the displacement element of the cartridge, wherein the coupling element is connected to the drive spindle in a rotationally fixed manner and comprises a first stop element radially spaced from the drive axis, wherein the displacement element comprises a second stop element radially spaced from the drive axis, and wherein the first stop element and the second stop element are arranged to cooperate in such a way that the coupling element is non-rotatably supported against the displacement element.

2. The system according to claim 1, wherein the housing comprises a wall through which the drive spindle can be passed with a first axial end, wherein the drive spindle can be brought into engagement, indirectly or directly, with the displacement element of the cartridge at the first axial end.

3. The system according to claim 2, wherein the drive spindle comprises a first rotation-preventing element along a section in the housing, wherein a second rotation-preventing element associated with the housing is provided, and wherein the first rotation-preventing element and the second rotation-preventing element interact in such a way that the drive spindle is supported in a non-rotatable manner against the housing over at least part of the stroke.

4. The system according to claim 3, wherein the first rotation-preventing element and the second rotation-preventing element establish a form-fit or a force fit.

5. The system according to claim 4, wherein the first rotation-preventing element and the second rotation-preventing element establish a form fit, wherein the second rotation-preventing element is elastically deformable or elastically movable away from the first rotation-preventing element against a restoring force and the form fit can be released thereby.

6. The system according to claim 1, wherein the actuating device comprises a motor control connected to the drive motor, which comprises a sensor system for determining an upper and a lower end position of the drive spindle.

7. The system according to claim 6, wherein the motor control is arranged to switch off the drive motor when the upper or lower end position is determined or to reverse the direction of rotation of the drive motor.

8. The system according to claim 7, wherein the actuating device comprises an elastic element which is arranged in such a way that, in an upper end position of the drive spindle in which it is retracted into the housing, it is biased indirectly or directly between the drive spindle and the housing with respect to the axial direction.

9. The system according to claim 8, wherein the elastic element is arranged between a second axial end of the drive spindle and a second wall section of the housing.

10. The system according to claim 8, wherein the elastic element is arranged between the coupling element and a first wall section of the housing.

11. The system according to claim 1, wherein the cartridge is connectable to the housing by means of a screw connection or a bayonet connection.

12. The system according to claim 1, wherein the seal is an annular, elastic seal with a U-shaped profile.

13. The system according to claim 12, wherein the actuating device comprises a carrier plate which, in the connected state, is axially gripped between a section of the housing and a section of the cartridge.

14. The system according to claim 13, wherein the U-profile of the seal engages around the edge of the carrier plate.

15. The system according to claim 14, wherein the seal together with the carrier plate is axially gripped between the section of the housing and the section of the cartridge in the connected state.

16. The system according to claim 1, wherein the drive axis and the joining direction coincide.

17. The system according to claim 1, wherein the actuating device comprises a switch for the drive motor, which switch acts in a contactless manner through a closed section of a wall of the housing.

18. The system according to claim 1, wherein the cartridge comprises a dispensing opening through which the viscous medium can be dispensed from the containing space, wherein the dispensing opening is secured against backflow of the dispensed medium by means of a non-return valve.

* * * * *